(No Model.)
J. F. GUILLOZ & J. D. PERRY.
MILK BUCKET.
No. 292,217. Patented Jan. 22, 1884.
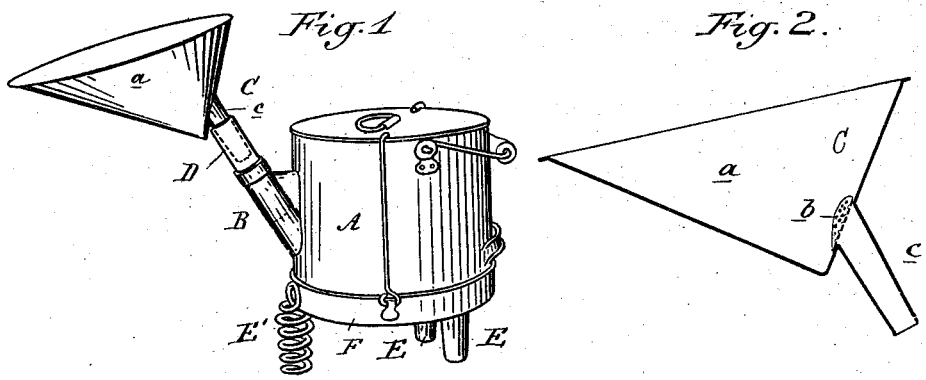
Witnesses:
Charles A. Meyer.
Theo. Mettetal
Inventors:
John F. Guilloz
Judson D. Perry

UNITED STATES PATENT OFFICE.

JOHN F. GUILLOZ AND JUDSON D. PERRY, OF DETROIT, MICHIGAN.

MILK-BUCKET.

SPECIFICATION forming part of Letters Patent No. 292,217, dated January 22, 1884.

Application filed July 31, 1883. (No model.)

*To all whom it may concern:*

Be it known that we, JOHN F. GUILLOZ and JUDSON D. PERRY, of Detroit, county of Wayne, and State of Michigan, have invented certain Improvements in Milk-Buckets, of which the following is a specification.

This invention relates to an improvement in milk-buckets; and it refers more specifically to that class of milk-buckets which are provided with a side inlet and are supported upon a base or legs, whereby the same are adapted to also serve as a milking-stool.

The improvement consists in the arrangement of the strainer and the manner of supporting the bucket upon two rigid and one or more yielding legs, all as hereinafter described and shown.

In the drawings which accompany this specification, Figure 1 is a perspective view of a milk-bucket of otherwise known construction, and to which our improvements are applied. Fig. 2 is a vertical central section of the strainer detached from the bucket.

The milk-bucket A, which is of known construction, except as hereinafter described, is provided with the side inlet, B, to which the strainer C is detachably connected by means of a rubber tube, D.

The strainer C, which forms one subject of our improvement, consists of the funnel-shaped cup $a$, the perforated diaphragm $b$, and the discharge-pipe $c$. The arrangement and construction of these parts are as follows: The discharge-pipe $c$ does not open into the bottom of the cup $a$, but into its side and a little distance above the bottom, and its opening is closed over by the perforated diaphragm $b$, through which the milk is strained in its passage from the cup into the bucket.

In practice, the strainer being attached to the bucket, as shown in Fig. 1, the milker milks into the flaring cup $a$, and as the bottom of the same cannot be drained completely by the discharge-pipe, a small quantity of milk will collect there and serve as a cushion for the streams of milk directed into the cup. This cushion of milk produces and maintains a quantity of froth, which will not alone prevent any spattering, but also the formation of the fine spray of milk, which soon dampens the sleeves of the milker by the use of similar buckets, but wherein the discharge is at the bottom of the cup.

Another advantage obtained by the use of our improved strainer is, that by putting the perforated diaphragm into the side of the cup the streams of milk discharged into the same in the operation of milking can have no tendency to wash the impurities through into the bucket, as would be the case if the strainer $b$ would form the bottom of the cup. As it is, the impurities will simply be washed off the perforated diaphragm and collect at the bottom of the cup.

E E E' are legs secured to the bottom of the bucket in any suitable manner; or, as in the drawings, they may be secured to a detachable base or ring, F, within which the bucket is supported. The legs E E are rigid, and are placed on the side opposite the inlet B. The leg E' is yielding, being made of a stiff coil-spring, and it is placed on the side where the inlet B is.

In practice, the milker sits upon the bucket, using it as a milking-stool, and by supporting part of his weight upon the rigid legs E E and steadying himself with his own legs he can easily bring more or less of his weight to bear upon the yielding leg E', which thereby will get more or less depressed and tilt the bucket at the desire of the operator. As cows are of varying height, this arrangement gives the milker a convenient means for bringing his bucket in the most suitable position for milking.

The rubber tube D is only loosely secured in the inlet-pipe B, and can therefore be easily drawn out or pushed in farther, as necessity requires, and it assists thereby in the adjustment obtained by means of the yielding leg.

It is clear that instead of one yielding leg two or more may be arranged on the side of the inlet-pipe B.

We deem it important that the perforated diaphragm $b$ be placed over the mouth of the discharge-pipe $c$, inside of the cup $a$, for by this construction no impurities can enter the pipe and clog it up, and thus interfere with the free flow of the milk through the same, as is very apt to be the case where the strainer is placed at the inner end of the tube, as has been proposed.

What we claim as our invention is—

1. A milk-bucket having a receiving-cup, as $a$, and adapted to be used as a stool, said bucket being provided with two rigid supporting-legs and one or more yielding ones, whereby the cup may be raised or lowered at will, substantially as described.

2. The combination of the milk-bucket A, inlet-pipe B, rubber tube D, strainer C, rigid legs E E, and yielding leg E', substantially as and for the purposes described.

JOHN F. GUILLOZ.
JUDSON D. PERRY.

Witnesses:
 CHARLES A. MEYER,
 THEO. METTETAL.